United States Patent
Görg et al.

(10) Patent No.: US 6,865,962 B2
(45) Date of Patent: Mar. 15, 2005

(54) MOUNTING UNIT FOR SENSOR SYSTEMS

(75) Inventors: Alexander Görg, Erkrath (DE); Bernd Stephan, Remscheid-Lennep (DE)

(73) Assignee: AB SKF, Gothenburg (SE)

( * ) Notice: Subject to any disclaimer, the term of this patent is extended or adjusted under 35 U.S.C. 154(b) by 63 days.

(21) Appl. No.: 10/224,333

(22) Filed: Aug. 21, 2002

(65) Prior Publication Data

US 2003/0056609 A1 Mar. 27, 2003

(30) Foreign Application Priority Data

Aug. 21, 2001 (DE) .......................................... 101 40 836

(51) Int. Cl.⁷ ......................... G01D 21/00; G01P 21/02; G01P 1/00; G01P 3/44
(52) U.S. Cl. ....................................... 73/866.5; 73/494
(58) Field of Search ......................... 73/866.5, 493–494

(56) References Cited

U.S. PATENT DOCUMENTS

| | | | |
|---|---|---|---|
| 4,942,295 A | | 7/1990 | Brunner et al. |
| 5,010,290 A | | 4/1991 | Foster |
| 5,011,302 A | * | 4/1991 | Mott et al. ................... 384/448 |
| 5,140,261 A | * | 8/1992 | Seo et al. ..................... 324/173 |
| 6,112,557 A | * | 9/2000 | Crabtree ..................... 66/125 R |
| 6,250,637 B1 | | 6/2001 | Oricchio, Jr. |
| 6,420,865 B1 | | 7/2002 | Rettenmeier |
| 6,446,005 B1 | * | 9/2002 | Bingeman et al. .......... 701/215 |
| 2001/0022655 A1 | * | 9/2001 | Stieff ..................... 356/139.09 |
| 2003/0159298 A1 | * | 8/2003 | Mieling .................... 33/203.15 |

FOREIGN PATENT DOCUMENTS

| | | | |
|---|---|---|---|
| DE | 37 40 744 A1 | 6/1988 | |
| DE | 197 45 818 A1 | 5/1998 | |
| DE | 20000694 U1 | * 3/2000 | ............ F16J/15/16 |
| DE | 199 22 215 A1 | 11/2000 | |
| EP | 0 353 395 A1 | 2/1990 | |

* cited by examiner

*Primary Examiner*—Thomas P. Noland
(74) *Attorney, Agent, or Firm*—Burns, Doane, Swecker & Mathis, L.L.P.

(57) ABSTRACT

A mounting unit for a sensor system includes a sensor wheel adapted to be mounted on a shaft, a sensor device adapted to be disposed on a sealing flange which seals the shaft, and a removable calibration aid fixing the sensor device in a precalibrated position on the sensor wheel. A process for mounting a sensor system involves aligning a sensor wheel and a sensor device in an aligned position relative to one another in a precalibration process, bringing together the sensor wheel and the sensor device in the aligned position with a calibration aid to form a mounting unit, positioning the mounting unit in a precise position on a shaft, fastening the sensor device to a sealing flange, and removing the calibration aid from the sensor wheel and the sensor device. The sealing flange can also be added to form a part of the mounting unit.

14 Claims, 3 Drawing Sheets

US 6,865,962 B2

MOUNTING UNIT FOR SENSOR SYSTEMS

This application is based on and claims priority under 35 U.S.C. §119 with respect to German Application No. 101 40 836.6 filed on Aug. 21, 2001, the entire content of which is incorporated herein by reference.

FIELD OF THE INVENTION

This invention generally relates to sensor systems. More particularly, the present invention pertains to a mounting unit for a sensor system and a process for mounting a sensor system.

A variety of different sensor systems are known which have a sensor wheel disposed on a shaft and a sensor device disposed on a sealing flange. By way of example, German Offenlegungsschrift No. DE 197 45 818 A1 discloses a sensor wheel disposed on a crankshaft of a vehicle and a corresponding sensor which is disposed on a sealing flange.

One problem associated with sensor systems of this type involves the adjustment of the sensor wheel, the shaft, and the sensor relative to one another. This adjustment has proven to be extremely difficult and expensive. On the one hand, it is frequently necessary to perform the adjustment with a relatively high degree of precision because, in systems used in motor vehicles for example, this has a direct effect on the exhaust quality, fuel consumption and power. On the other hand, the expenditure in the sense of cost-effective manufacturing should be held as low as possible.

A need thus exists for a way to mount a sensor system in a relatively highly precise manner, while at the same time being relatively simple and not excessively expensive.

SUMMARY OF THE INVENTION

According to one aspect, a mounting unit for a sensor system includes a sensor wheel adapted to be mounted on a shaft, a sensor device adapted to be disposed on a sealing flange which seals the shaft, and a removable calibration aid fixing the sensor device in a precalibrated position on the sensor wheel.

The mounting unit advantageously provides a relatively highly precise final mounting of the sensor system without complex adjustment work. By virtue of the calibration aid being connected to the sensor device, a relatively precise and secure seating of the calibration aid, and simple handling, are achieved.

The calibration aid is advantageously fastened to the sensor wheel by way of a sealing compound so that a reliable and precise fixing in an arbitrary or desired position is possible.

In a variation, the sealing flange can form a component of the mounting unit. It is thus possible to mount the sealing flange within the same mounting process. In addition, the sealing flange can be connected to the sensor unit by form-locking engagement.

According to another aspect, a process for mounting a sensor system involves aligning a sensor wheel and a sensor device in an aligned position relative to one another in a precalibration process, bringing together the sensor wheel and the sensor device in the aligned position with a calibration aid to form a mounting unit, positioning the mounting unit in a precise position on a shaft, fastening the sensor device to a sealing flange, and removing the calibration aid from the sensor wheel and the sensor device.

In a variation on this aspect, the sealing flange is added to the mounting unit. After positioning on the shaft, the sealing flange is fastened to a base together with the sensor device.

It is advantageous during precalibration to align the sensor wheel and the sensor device relative to one another so that the sensor device issues a predefined signal since alignment with the aid of the sensor signal permits the highest precision independently of component tolerances that may exist.

The calibration aid is preferably fastened in a form-locking manner to the sensor device and is preferably fastened by way of a sealing compound to the sensor wheel.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements.

DETAILED DESCRIPTION OF THE INVENTION

Figure 1:
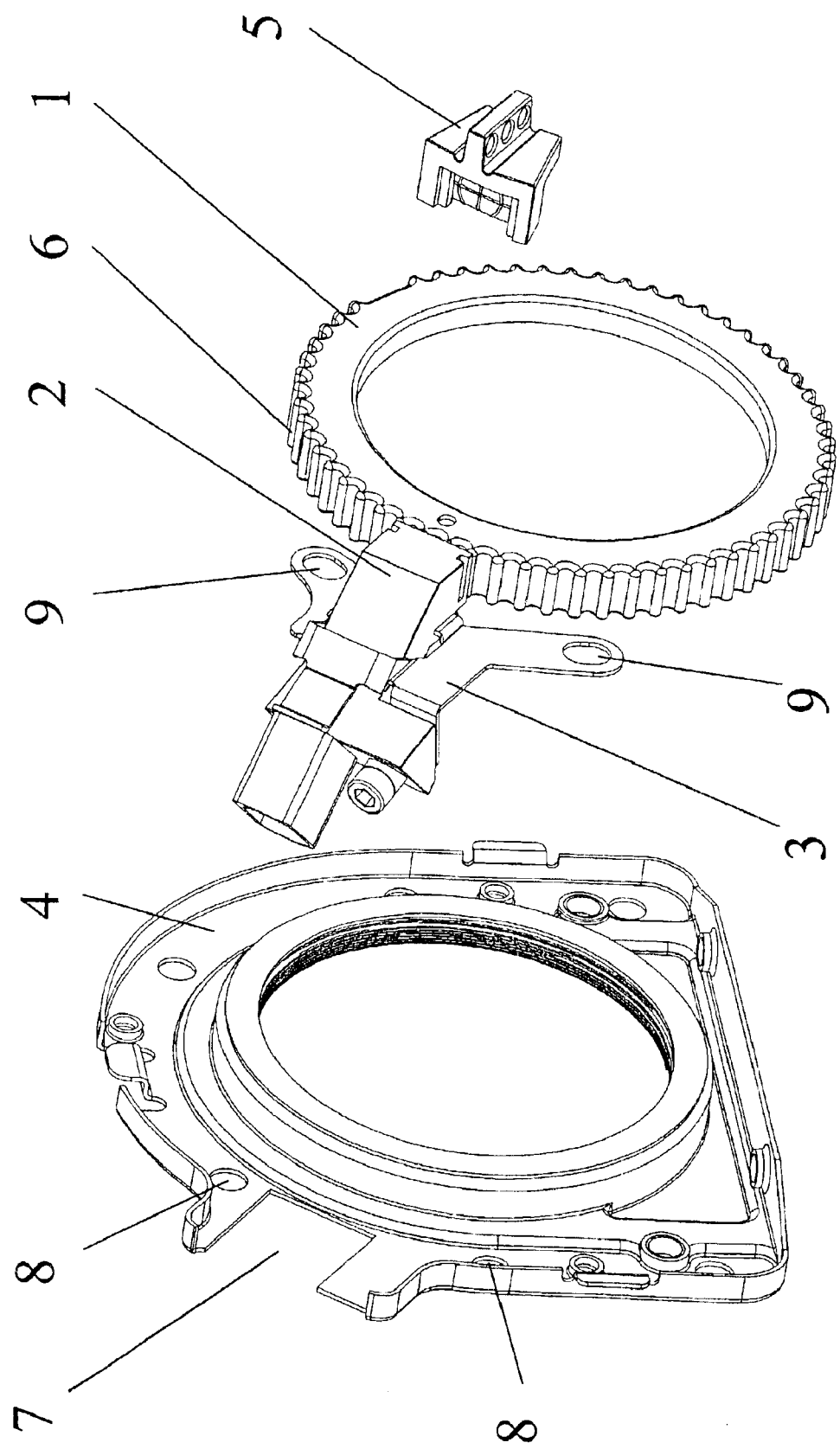
FIG. 1 is a perspective view of components of a sensor illustrated in the unmounted state.

FIG. 1 illustrates in perspective view components of an unmounted sensor system. The sensor system is comprised of a sensor wheel 1 and a sensor device 2 with a holding device 3. FIG. 1 also illustrates a sealing flange 4 and a calibration aid 5. The sealing flange 4 and the calibration aid 5 do not form a part of the sensor system directly, but are used in the mounting of the sensor system.

The sensor wheel 1 includes outer toothing 6 and is adapted to be mounted on a shaft (illustrated in FIG. 3), for example the crankshaft of an internal combustion engine. In the mounted state, the sensor wheel 1 is connected in a rotationally fixed manner to the shaft so that a definite or defined relationship exists between the current angle of rotation of the shaft and the outer toothing 6 disposed on the sensor wheel 1. The outer toothing 6 is sampled or sensed by the sensor device 2 which accordingly issues a signal as a function of the angle of rotation of the shaft.

In the mounted state, the sealing flange 4 is sealed statically to the base (illustrated in FIG. 3) on which it is mounted. This base can be, by way of example, the motor block. In addition, the sealing flange 4 is sealed dynamically to the shaft. The sealing flange 4 has on its outer circumference a recess 7 in the area of which the holding device 3 of the sensor device 2 is positioned during the mounting of the sensor system. In order to make it possible to screw the sealing flange 4 and the holding device 3 jointly onto the base, the sealing flange 4 and the holding device 3 each have a respective pair of holes 8, 8 and 9, 9 arranged congruently so that each of the holes 9, 9 in the holding device 3 is aligned with one of the holes 8 in the sealing flange 4.

Figure 2:
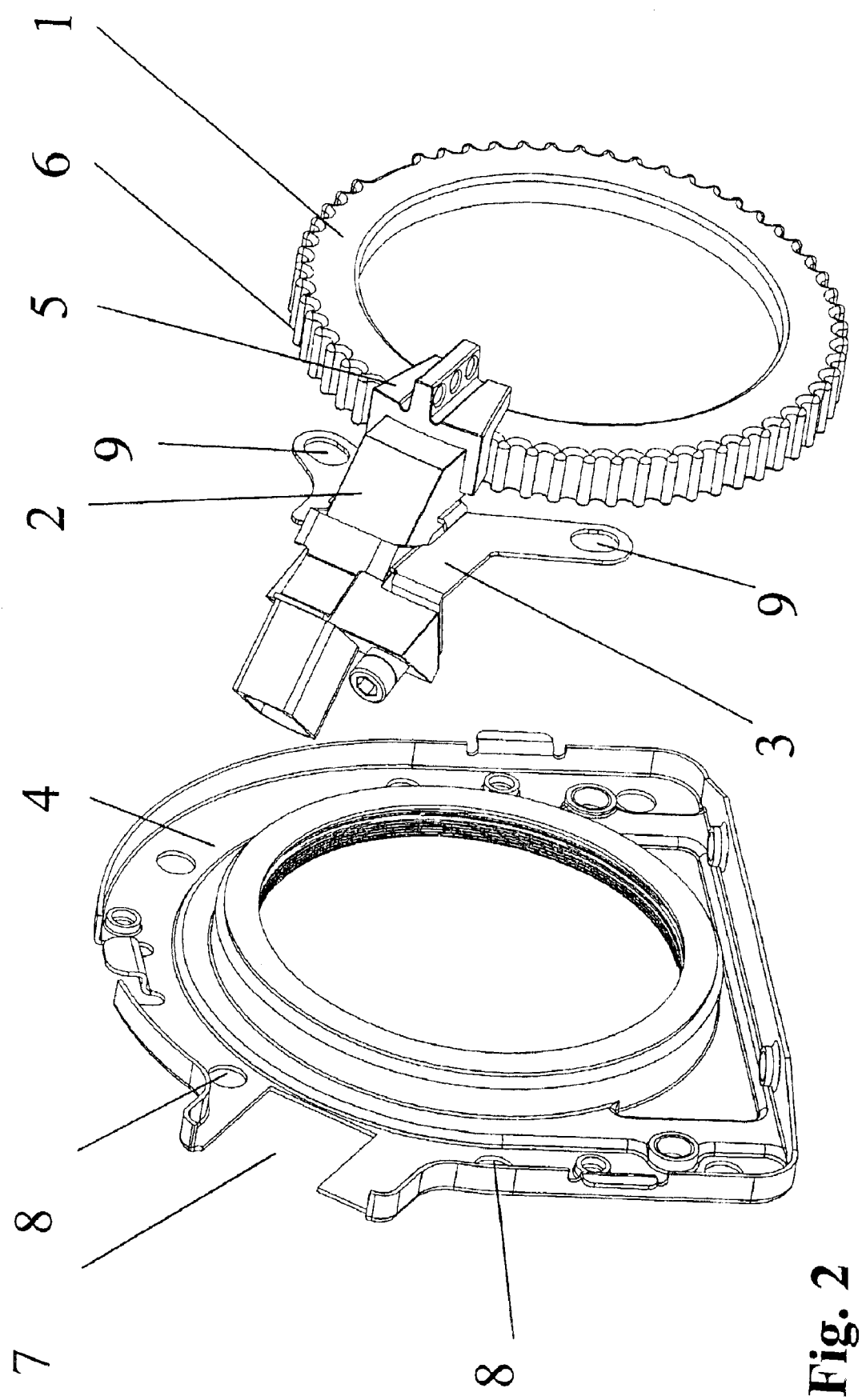
FIG. 2 is a perspective view of a form of a mounting unit for a sensor system and a step associated with the mounting method.

FIG. 2 shows one embodiment of the mounting unit as well as a mounting step according to the disclosed embodiment of the invention. In the case of this embodiment, the sensor wheel 1 and the sensor device 2 including the holding device 3 are connected or fastened to one another by way of a calibration aid 5 to form a mounting unit. The calibration aid 5 encirclingly engages the sensor device 2 in a form-locking manner and is connected to the sensor wheel 1 by way of a sealing compound.

The form locking engagement between the calibration aid 5 and the sensor device 2 can involve the calibration aid 5 being configured so that a portion of the calibration aid 5 at least partially encircles or surrounds the sensor device 2 as shown. The form-locking engagement between the calibration aid 5 and the sensor device 2 can also be facilitated by providing the calibration aid 5 with inwardly directed opposing projections that engage respective grooves positioned on opposite sides of the sensor device 2 as generally shown in FIG. 1.

The use of a sealing compound to fasten the calibration aid 5 to the sensor wheel 1 makes it possible for the sensor device 2 to be fixed in any arbitrary or desired position relative to the outer toothing 6 of the sensor wheel 1. This degree is required because the sensor wheel 1 and the sensor device 2 are not merely brought together purely mechanically but rather are fixed or positioned relative to one another in a precalibration process with evaluation of the signals issued by the sensor device 2. In this way, faulty positioning as a consequence of component tolerances can be avoided. This means, by way of example, that deviations in the outer dimensions of the sensor device 2 can be avoided or eliminated. If, on the other hand, in bringing together the sensor wheel 1 and the sensor device 2 the orientation was to the outer surfaces of the sensor device 2, the deviations would have had a corresponding faulty adjustment as their consequence. The precision of positioning between the sensor wheel 1 and the sensor device 2 can be increased by the precalibration process.

The mounting unit represented in FIG. 2 is intended for mounting on a shaft and for fastening to an already mounted sealing flange 4. The process of mounting the sensor wheel 1 and the sensor device 2 involves both the sensor wheel 1 and the sensor device 2 first being joined together by way of the calibration aid 5 to form a precalibrated mounting unit, the mounting unit being mounted, and subsequently the connection between the sensor wheel 1 and the sensor device 2 being removed once again. More specifically, the mounting process is as follows.

In a first step, the sensor wheel 1 and the sensor device 2 are brought into proximity to one another as represented in FIG. 1. In this position, the sensor wheel 1 and the sensor device 2 are aligned relative to one another in which first of all a gross or more general relative orientation is carried out with the aid of the geometry and subsequently the angle of rotation of the sensor wheel 1 is varied until the sensor device 2 issues a predefined signal. Thereafter, the calibration aid 5 is pushed onto the sensor device 2 and is thereby connected to the sensor wheel 1 in a form-locking manner in the circumferential direction of the sensor wheel 1. The calibration aid 5 is fixed on the sensor wheel 1 by means of a sealing compound. Through the measures described, a mounting unit corresponding to the illustration in FIG. 2 is produced in which the sensor wheel 1 and the sensor device 2 are disposed in a rotationally fixed manner relative to one another in a predefined alignment. This mounting unit is positioned with the sensor wheel 1 in a precise or desired position on the shaft. Subsequently, the holding device 3 of the sensor 2 is fixed on the sealing flange 4, which was previously screwed onto the base. As a last step, the calibration aid 5 is removed from the sensor wheel 1 and the sensor 2.

Figure 3:
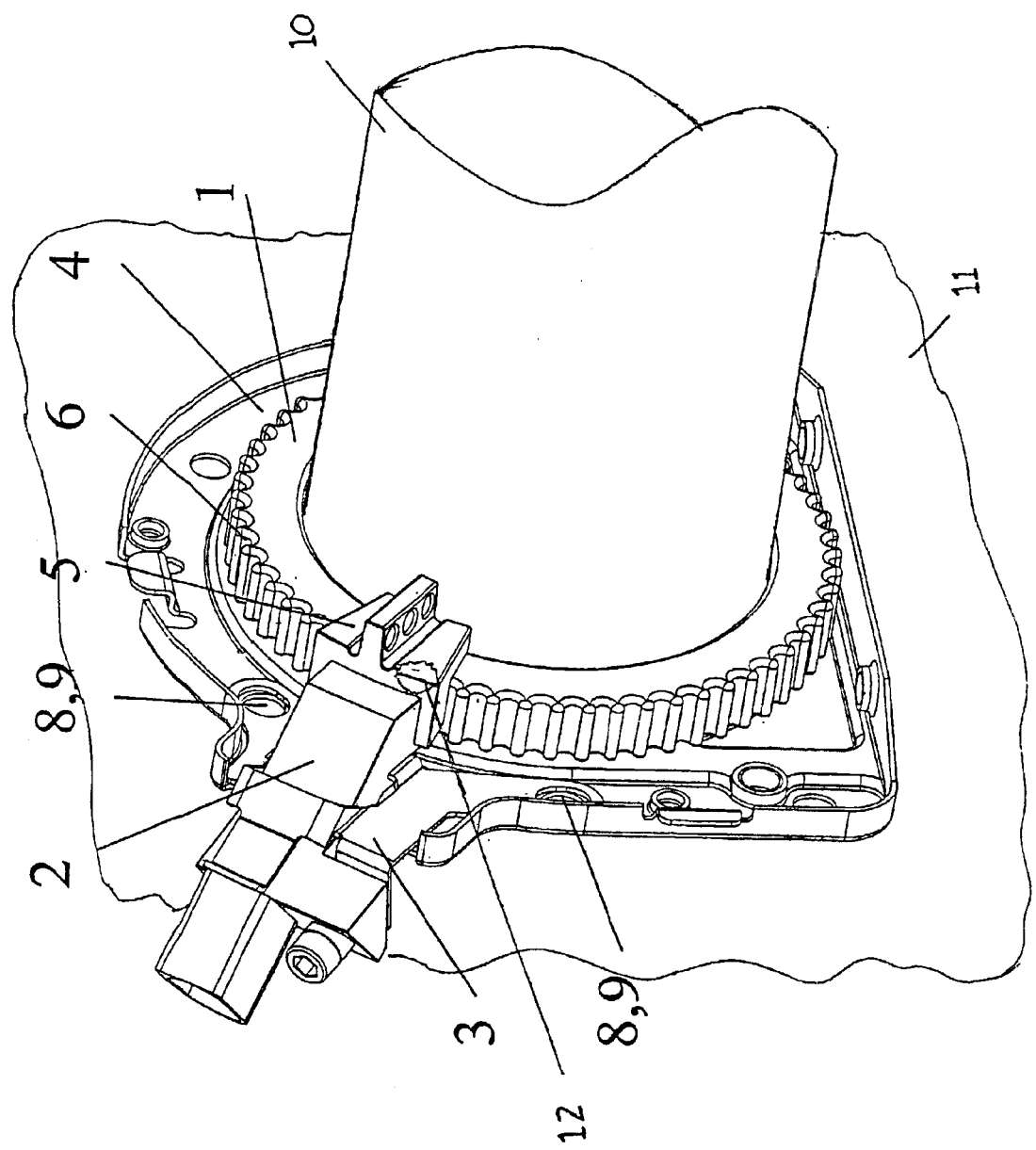
FIG. 3 is a perspective view of an additional form of a mounting unit for a sensor system and a step associated with the mounting method.

FIG. 3 shows a variation with respect to the embodiment of the mounting unit described above. This version of the mounting unit differs from that shown in FIG. 2 and described above in that the mounting unit also includes the sealing flange 4. The mounting unit according to FIG. 3 is mounted according to the process already described above, with the difference residing in the sealing flange 4 being added at the end of the precalibration process of the mounting unit as an additional component. After positioning the sensor wheel 1 in the precise position on the shaft 10, the holding device 3 is screwed onto the base 11 together with the sealing flange 4. FIG. 3 also illustrates the sealing compound 12 that can be used to fix the calibration aid 5 to the sensor wheel 1.

It is to be noted also that the sealing flange 4 can be connected to the sensor unit in a form-locking manner such as by virtue of the holding device 3 of the sensor 2 being positioned in the recess 7 so as to be locked or fixed at least with respect to some directions.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A sensor system mounting unit comprising:
 a sensor wheel adapted to be mounted on a shaft;
 a sensor device adapted to be disposed on a sealing flange which seals the shaft; and
 a removable calibration aid fixing the sensor device in a desired or arbitrary position relative to the sensor wheel which is determined by evaluation of signals issued by the sensor device.

2. The sensor system mounting unit according to claim 1, wherein the calibration aid is connected to the sensor device in a form-locking manner.

3. The sensor system mounting unit according to claim 2, wherein the calibration aid is connected to the sensor wheel by sealing compound.

4. The sensor system mounting unit according claim 3, wherein the sealing flange is a component of the mounting unit.

5. The sensor system mounting unit according to claim 1, wherein the calibration aid is connected to the sensor wheel by sealing compound.

6. The sensor system mounting unit according claim 1, wherein the sealing flange is a component of the mounting unit.

7. A sensor system mounting unit comprising:
 a sensor wheel adapted to be mounted on a shaft;
 a sensor device adapted to be disposed on a sealing flange which seals the shaft; and
 a calibration aid removably fixed directly to the sensor wheel and connected to the sensor device to fix the sensor device in position on the sensor wheel.

8. The sensor system mounting unit according to claim 7, wherein the calibration aid is connected to the sensor device in a form-locking manner.

9. The sensor system mounting unit according to claim 7, wherein the calibration aid is connected to the sensor wheel by sealing compound.

10. The sensor system mounting unit according claim 7, wherein the sealing flange is a component of the mounting unit.

11. The sensor system mounting unit according to claim 10, wherein the calibration aid is connected to the sensor wheel by sealing compound.

12. A sensor system mounting unit comprising:

a sensor wheel adapted to be mounted on a shaft;

a sensor device adapted to be disposed on a sealing flange which seals the shaft; and a calibration aid removably fixed to the sensor wheel by a sealing compound and fixing the sensor device in position relative to the sensor wheel.

13. The sensor system mounting unit according to claim 12, wherein the calibration aid is connected to the sensor device in a form-locking manner.

14. The sensor system mounting unit according claim 12, wherein the sealing flange is a component of the mounting unit.

* * * * *